J. H. WAGENHORST.
TIRE RIM.
APPLICATION FILED MAY 11, 1917.
1,276,597.
Patented Aug. 20, 1918.
2 SHEETS—SHEET 1.
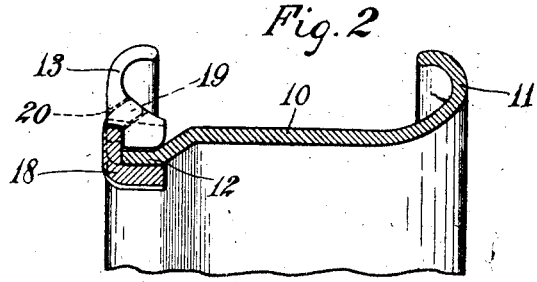
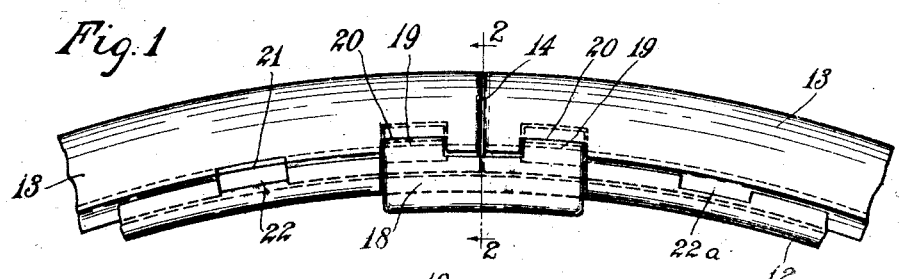
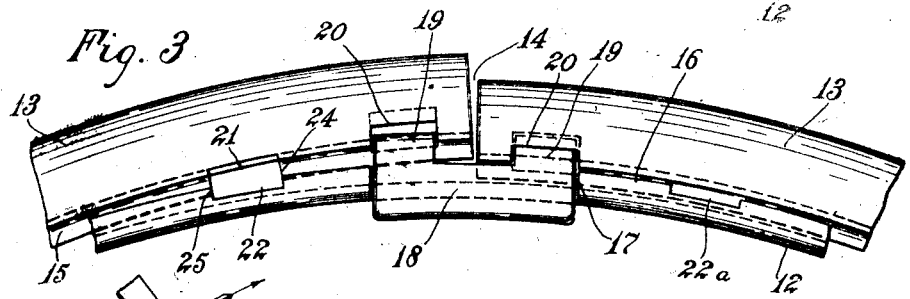
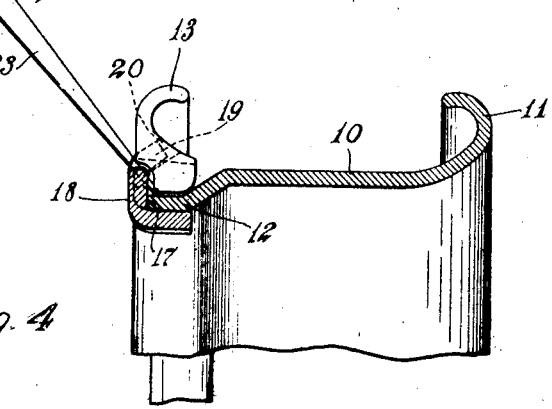
INVENTOR.
James H. Wagenhorst
BY
ATTORNEY

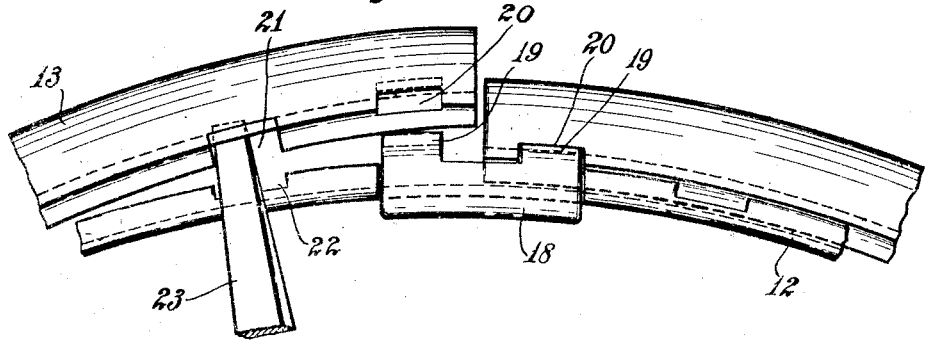
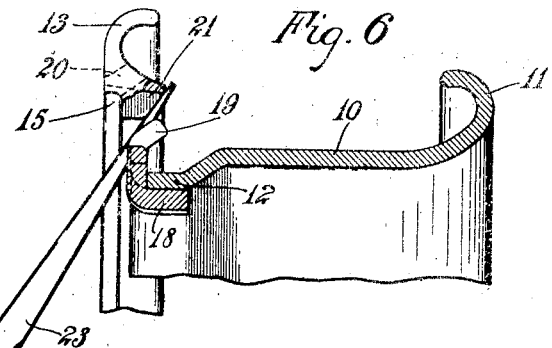
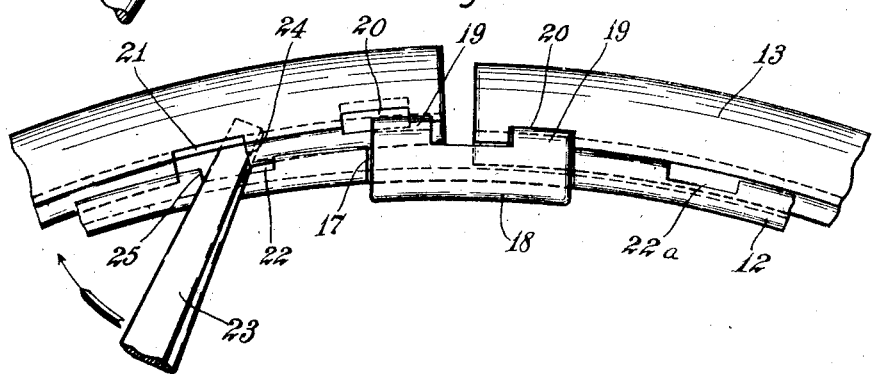

_BEST AVAILABLE COPY_

UNITED STATES PATENT OFFICE.

JAMES H. WAGENHORST, OF AKRON, OHIO, ASSIGNOR TO THE B. F. GOODRICH COMPANY, OF NEW YORK, N. Y., A CORPORATION OF NEW YORK.

TIRE-RIM.

1,276,597.  Specification of Letters Patent.  Patented Aug. 20, 1918.

Application filed May 11, 1917. Serial No. 167,894.

*To all whom it may concern:*

Be it known that I, JAMES H. WAGENHORST, a citizen of the United States, residing at Akron, in the county of Summit and State of Ohio, have invented certain new and useful Improvements in Tire-Rims, of which the following is a specification.

This invention relates to rims for pneumatic tires, having a quick-detachable split bead-retaining ring on one side, and its object is to provide an improved form of locking device for the ends of the ring, which may be cheaply manufactured and will combine ample security with ease of attachment and removal. My invention is mainly an improvement upon the type of rim covered by the Shaw Patents No. 926,296 of June 29, 1909, and No. 1,009,347 of November 21, 1911.

Of the accompanying drawings,

Figure 1 is an edge or side view of a segment of a tire rim embodying my invention.

Fig. 2 is a section on the line 2—2 of Fig. 1.

Fig. 3 is a view similar to Fig. 1 showing one end of the ring partly unseated.

Fig. 4 is a cross-section corresponding to Fig. 3 and showing the application of a ring-removing tool.

Fig. 5 is a side elevation which illustrates the use of the tool in getting the end of the ring free of the locking device.

Fig. 6 is a cross-section corresponding to Fig. 5.

Fig. 7 is a side elevation illustrating the use of the tool for contracting the ring so as to get it into locking position.

The rim here shown is provided with hooked flanges for a clencher tire, but the invention is equally applicable to rims for straight-bead tires. The base 10 and the inner bead flange 11 are preferably in one piece as illustrated, and the outer edge of the base is rolled with a depressed channel 12, forming a groove in which the side-ring 13 is seated, the latter being of the familiar type which is transversely split at one point 14 and so made that its ends tend to spring together. The ring 13 is grooved at 15 so that its base or tongue lies in the groove of the channel 12 and its shoulder overhangs the outer lip 16 of the channel when the ring is in place.

This outer lip 16 is recessed or cut away 17 to receive the radial flange of an L-shaped locking plate 18, whose lateral or horizontal flange underlies the bottom of the channel 12, the said plate being permanently fixed to the rim channel in a suitable way, as by spot-welding it thereto. On the upper edge of the locking plate are formed two lugs or projections 19, turned inwardly in a slanting direction so that they overhang the channel 12, and adapted to enter a pair of slanting holes 20 which are punched through the two ends of the ring 13 on either side of the split 14, the inner side of the channel being beveled so that either ring end may engage with its lug by a slanting movement laterally outward and radially inward of the rim as the ring seats in the channel, and may be unlocked by the reverse of that movement.

The base of the ring is notched at 21 near one end and the lip of the channel is formed with a registering notch 22, the two notches providing a rectangular opening into which the end of a screw-driver or other suitable tool may be inserted for prying that end of the ring out of its channel when the ring is to be removed, and also for drawing the ends together when the ring is being applied. The right-hand end of the notch 21 and the left-hand end of the notch 22 form tool abutments or shoulders 24, 25 for the ring-contracting movement as will be hereinafter described in connection with Fig. 7. Similar notches may be provided for the other end of the ring, but I have shown the rim only as having a notch 22ª at that point.

The side ring 13 is shown in Figs. 1 and 2 as fully seated and interlocked with the lugs 19 on the locking plate, and its ends are then prevented from becoming accidentally displaced. The pressure of the inflated tire tends to maintain this engagement by forcing the ring laterally outward, such outward movement also producing a radial inward wedging reaction on the ring ends due to the slanting lugs 19 and the bottoms of the holes, slots or recesses 20. Even if the tire should become deflated, the overhang of the lugs 19 makes it practically impossible for any ordinary force or jar to unlock the ends of the ring. The ring may, however, be very readily detached with the aid of a screw-driver blade 23 or similar tool when the tire is deflated. The end of said blade is inserted in the notches 21, 22 with its point resting against the floor and outer lip of the channel 12 as indicated in Fig. 4, and then with this point as a fulcrum, the tool is swung upwardly as indicated by the arrow so as to pry loose the end of the ring and start it out of the groove in the channel 12. After the point of the screw-driver has been worked nearly or quite across the channel and the lug 19 has nearly come out of the hole 20, the screw-driver is swung in the reverse direction, or downwardly, as indicated in Fig. 6, so that it fulcrums on the bottom of the notch 22 and first forces the end of the ring clear of the lug 19 and then pries it outwardly across the outer lip of the channel 12, by which time the base of the ring will have left the channel for a considerable distance around the circumference of the rim, and said ring may then be grasped by the operator's hands so as readily to pull it entirely away from the rim by a progressive stripping action, at the finish of which the right-hand end of the ring easily comes away from the corresponding lug 19. In replacing the ring, the right-hand end is first engaged with its lug 19 and said ring is progressively hammered into the channel in the usual way. If the left-hand lug does not readily enter the hole 20, the final locking may be assisted by a circumferential prying action exerted by the screw-driver between the left-hand end of the notch 22 and the right-hand end of the notch 21 in order to contract the ring as indicated in Fig. 7.

I claim:

1. A tire rim comprising, in combination, a rim base formed with a channel on one edge, a fixed locking lug slanting radially outward and laterally inward over said channel, and a transversely-split locking ring seated in said channel and formed near one end with an aperture entered by the lug as the ring end seats in the channel by a movement laterally outward and radially inward of the rim.

2. In a tire rim, the combination of a rim base having a channel, a pair of fixed locking lugs slanting radially outward and laterally inward over said channel from the outer edge thereof, and a split locking ring seated in said channel and formed near its ends with transverse apertures occupied by said lugs.

3. In a tire rim, the combination of a rim base having a channel with a recessed outer lip, a ring-locking plate in said recess permanently fixed to the rim, and a ring in the channel, interlocked with said plate and disengageable therefrom by a slanting movement radially outward and laterally inward of the rim.

4. A tire rim comprising, in combination, a rim base having a channel, a plate permanently fixed to the rim and having a locking lug slanting radially outward and laterally inward over the channel, and a transversely-split side ring seated in said channel and having an end portion underlying said lug.

5. In a tire rim, the combination of a rim base having a channel, a transversely-split side ring seated in said channel and formed with transverse apertures in its ends, and a locking plate permanently fixed to the rim and having a pair of lugs slanting radially outward and laterally inward over said channel and occupying said apertures.

6. In a tire rim, the combination of a rim base having a channel whose outer lip is formed with a recess, an L-shaped locking plate permanently fixed to the rim, with its lateral flange underlying the channel and its radial flange in the recess, said plate having a pair of lugs slanting radially outward and laterally inward over the channel, and a transversely-split side ring seated in the channel and formed with transverse apertures in its ends occupied by said lugs.

7. In a tire rim, the combination of a rim base having a marginal ring-retaining lip, and a transversely-split side ring, said rim and ring having fixed locking members in the lateral zone of the ring which engage by a slanting outward lateral and inward radial movement of the ring end, the rim and ring also having an aperture formed between them at the base of the ring near its locking end to receive the end of a prying tool which fulcrums both inside the channel and on top of the rim lip to force the ring end laterally inward and radially outward in unlocking it.

In testimony whereof I have hereunto set my hand this 10th day of May, 1917.

JAMES H. WAGENHORST.